(12) United States Patent
Lin et al.

(10) Patent No.: US 11,460,634 B2
(45) Date of Patent: Oct. 4, 2022

(54) METHOD FOR DETECTING LOW-POWER OPTICAL SIGNAL WITH HIGH SENSITIVITY

(71) Applicant: Marvell Asia Pte, Ltd., Singapore (SG)

(72) Inventors: Jie Lin, Santa Clara, CA (US); Masaki Kato, Palo Alto, CA (US); Bruno Tourette, Santa Clara, CA (US); Brian Taylor, Santa Clara, CA (US)

(73) Assignee: Marvell Asia Pte Ltd., Singapore (SG)

( * ) Notice: Subject to any disclaimer, the term of this patent is extended or adjusted under 35 U.S.C. 154(b) by 0 days.

(21) Appl. No.: 17/012,629

(22) Filed: Sep. 4, 2020

(65) Prior Publication Data

US 2022/0075115 A1 Mar. 10, 2022

(51) Int. Cl.
*G02B 6/12* (2006.01)
*H04B 10/43* (2013.01)
*H04B 10/61* (2013.01)

(52) U.S. Cl.
CPC ......... *G02B 6/12019* (2013.01); *H04B 10/43* (2013.01); *H04B 10/6165* (2013.01)

(58) Field of Classification Search
CPC . H04B 10/43; H04B 10/6165; G02B 6/12019
USPC ........................................................ 385/31
See application file for complete search history.

(56) References Cited

U.S. PATENT DOCUMENTS

| | | | | |
|---|---|---|---|---|
| 5,410,145 A * | 4/1995 | Coroy | ................. | H03F 3/087 |
| | | | | 257/E27.127 |
| 5,416,345 A * | 5/1995 | Matsunaga | ....... | H01L 27/14831 |
| | | | | 257/230 |
| 5,663,564 A * | 9/1997 | Radford | ................. | G01J 1/16 |
| | | | | 250/338.4 |
| 5,747,791 A | 5/1998 | Coroy | | |
| 5,796,883 A * | 8/1998 | Hamamoto | ............. | H01S 5/026 |
| | | | | 372/50.1 |
| 6,118,397 A * | 9/2000 | Heflinger | .................. | G02F 7/00 |
| | | | | 341/137 |
| 7,248,800 B2 * | 7/2007 | Shimada | ............. | H04B 10/503 |
| | | | | 398/208 |
| 8,320,779 B2 * | 11/2012 | Fukuchi | ................. | H04B 10/66 |
| | | | | 398/208 |

(Continued)

OTHER PUBLICATIONS

Sun et al; Ge-on-Si waveguide photodiode array for high power Applications; 2018; IEEE; pp. 1-2. (Year: 2018).*

(Continued)

*Primary Examiner* — Amritbir K Sandhu

(57) ABSTRACT

A method for making a pair of photodiodes to detect low-power optical signal includes providing a waveguide including one or more branches in a silicon photonics substrate to deliver an input optical signal to the silicon photonics integrated circuit; forming a pair of nearly redundant photodiodes in silicon photonics platform in the silicon photonics substrate. coupling a first one of the pair of nearly redundant photodiodes optically to each of the one or more branches for receiving the input optical signal combined from all of the one or more branches; coupling a second one of the pair of nearly redundant photodiodes electrically in series to the first one of the pair of nearly redundant photodiodes; and drawing a current from the first one of the pair of nearly redundant photodiodes under a reversed bias voltage applied to the pair of nearly redundant photodiodes.

19 Claims, 4 Drawing Sheets

(56) References Cited

U.S. PATENT DOCUMENTS

| | | | | |
|---|---|---|---|---|
| 9,191,388 B1* | 11/2015 | Paczkowski | ............ | G06F 21/53 |
| 9,310,247 B2 | 4/2016 | Raynor et al. | | |
| 9,491,388 B2* | 11/2016 | Sargent | ............ | H01L 27/14636 |
| 9,618,392 B2* | 4/2017 | Kippenberg | ............... | G01J 3/45 |
| 10,056,733 B1* | 8/2018 | Taylor | .................... | H01S 5/021 |
| 10,715,258 B1* | 7/2020 | Melikyan | ................ | H04J 14/06 |
| 11,153,010 B2* | 10/2021 | Pandit | ................ | H04B 10/1129 |
| 2001/0024162 A1* | 9/2001 | Lee | ...................... | G08B 13/183 |
| | | | | 340/556 |
| 2005/0001277 A1* | 1/2005 | Rhodes | ............... | H01L 27/1463 |
| | | | | 257/431 |
| 2008/0239321 A1* | 10/2008 | Chen | .................... | G01J 1/1626 |
| | | | | 257/E31.127 |
| 2009/0206437 A1* | 8/2009 | Takeyama | ............ | H01L 31/102 |
| | | | | 257/E31.001 |
| 2009/0226187 A1* | 9/2009 | Tanimura | ............. | H04B 10/677 |
| | | | | 398/202 |
| 2013/0294766 A1* | 11/2013 | Cai | ......................... | H01L 31/18 |
| | | | | 438/69 |
| 2015/0037048 A1* | 2/2015 | Na | ........................ | H01L 31/028 |
| | | | | 257/432 |
| 2019/0391006 A1 | 12/2019 | Pelletier et al. | | |
| 2022/0075115 A1* | 3/2022 | Lin | ........................ | H04B 10/43 |

OTHER PUBLICATIONS

Sun et al; Ge-on-Si waveguide photodiode Array for high-power Applications; 2018; Department of Electrical and Computer Engineering University of Virginia; pp. 1-2. (Year: 2018).*

Piels et al; Photodetectors for silicon photonic integrated circuits; 2016;Department of Electrical and Computer Engineering University of California Santa Barbara; pp. 1-18. (Year: 2016).*

Piels et al; photodetectors for silicon photonic integrated circuits; 2016; Elsevier Ltd; pp. 1-18. (Year: 2016).*

Notification dated Feb. 8, 2022 of European Search Report corresponding to European Patent Application No. 21194861.7, 11 pages.

* cited by examiner

METHOD FOR DETECTING LOW-POWER OPTICAL SIGNAL WITH HIGH SENSITIVITY

BACKGROUND OF THE INVENTION

The present invention relates to optical communication device. More particularly, the present invention provides a method for making high-sensitivity photodiode pair for detecting low-power optical signal in silicon photonics platform.

Over the last few decades, the use of broadband communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. Additionally, Internet of Things certainly will create even higher demand on data communication. With such high demands on data and data transfer, existing data communication systems need to be improved to address these needs.

As science and technology are updated rapidly, processing speed and capacity of the computer increase correspondingly. With the advances of optical communication technology and applications driven by the market demand on increasing bandwidth and decreasing package footprint, more intensive effort and progress have been seen in the development of silicon photonics. With its low-cost and CMOS compatible fabrication process, integration of electro-photonic circuits in silicon-on-insulator (SOI) substrate for forming high-speed high-data-rate silicon photonics devices has continuously gaining its market in broadband optic-electric communication system.

With the increasing demand of high bandwidth and high integrability in optical communication system, the optical components are more and more integrated in silicon photonics substrate with reducing device dimensions, resulting a work environment with low-power optical signals and quickly increasing temperature. For example, photodiodes made in silicon photonics platform need to be optimized for detecting low-power optical signal with enhanced sensitivity. However, existing silicon photonics based photodiodes on SOI substrate can get their dark current increase as much as 8 times when temperature increases from room temperature to 95° C. at a bias voltage of merely –2V and as much as 4 times over their device lifetime. Therefore, improvement on detecting low-power optical signal with high sensitivity in silicon photonics system is needed.

BRIEF SUMMARY OF THE INVENTION

The present invention relates to optical communication device. More particularly, the present invention provides a method for detecting low-power optical signal in silicon photonics platform. Merely by example, the present invention discloses a method for making a photodiode pair in a close-neighborhood of a silicon photonics substrate to detect one or more branches of input optical signals in low-power with high-sensitivity, though other applications are possible.

In a specific embodiment, the present invention provides a method for making a pair of photodiodes to detect low-power optical signal in a silicon photonics integrated circuit. The method includes providing a waveguide in a silicon photonics substrate to deliver an input optical signal to the silicon photonics integrated circuit. The waveguide includes one or more branches in the silicon photonics substrate. Additionally, the method includes forming a pair of nearly redundant photodiodes in silicon photonics platform in the silicon photonics substrate. The method further includes coupling a first one of the pair of nearly redundant photodiodes optically to each of the one or more branches for receiving the input optical signal combined from all of the one or more branches. Furthermore, the method includes coupling a second one of the pair of nearly redundant photodiodes electrically in series to the first one of the pair of nearly redundant photodiodes. Moreover, the method includes drawing a current from the first one of the pair of nearly redundant photodiodes under a reversed bias voltage applied to the pair of nearly redundant photodiodes.

In another specific embodiment, the present invention provides a method for detecting a low-power optical signal in a waveguide of a silicon photonics system. The method includes coupling a first photodiode to a taping output port of the waveguide to absorb a certain portion of power of the low-power optical signal. Additionally, the method includes providing a second photodiode that is nearly redundant to the first photodiode excluded from any power of the low-power optical signal. The method further includes applying a reversed bias voltage commonly to the first photodiode and the second photodiode. Furthermore, the method includes drawing a first current from the first photodiode under the reversed bias voltage including a photocurrent converted from the certain portion of power of the low-power optical signal and a first dark current. The method further includes drawing a second current from the second photodiode under the reversed bias voltage including a second dark current. Moreover, the method includes performing a firmware process to subtract the second current from the first current.

Many benefits can be achieved with the present invention on a method for detecting low-power optical signal received in silicon photonics circuit. The method takes advantage of existing silicon-photonics-based photodiode (PD) pair formed in a close-neighborhood in a SOI substrate to yield nearly redundant physical properties. The photodiode pair includes a main PD coupled in series, cathode to anode, with a dummy PD. The main PD is configured to couple one or more branches of an input waveguide in the SOI substrate for detecting low-power optical signals with at least doubled sensitivity. The dummy PD is used to cancel dark current in the main PD to substantially reduce noise of photocurrent drawn from the main PD. The invention effectively increases power monitoring accuracy with minimum alternation in existing device formation process by at least doubling the sensitivity and minimizing dark current variation. The invention provides a simple way for detecting low-power optical signal with high sensitivity especially for the photodiodes in silicon photonics modules working at environment temperature as high as 95° C. for lifetime over 8000 hrs.

The present invention achieves these benefits and others in the context of CMOS-compatible process for fabricating silicon photonics devices. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also under

DETAILED DESCRIPTION OF THE INVENTION

The present invention relates to optical communication device. More particularly, the present invention provides a method for detecting low-power optical signal in silicon photonics platform. Merely by example, the present invention discloses a method for making a photodiode pair in a close-neighborhood of a silicon photonics substrate to detect one or more branches of input optical signals in low-power with high-sensitivity, though other applications are possible.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, main, dummy, close-neighbor, reverse, forward, series, parallel, have been used for convenience purposes only and are not intended to imply any particular fixed direction. Instead, they are used to reflect relative locations and/or directions between various portions of an object.

Figure 1:
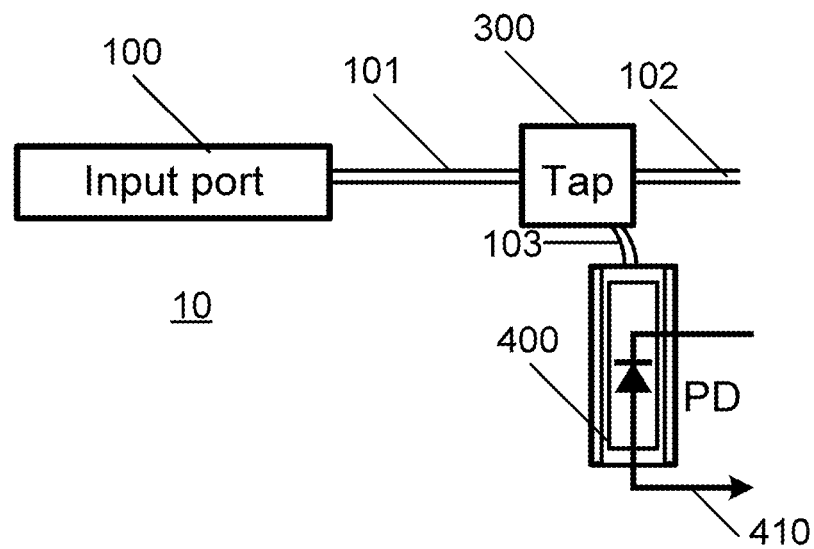
- FIG. 1 is a schematic diagram of a photodiode being used conventionally in a silicon photonics circuit for detecting an optical signal delivered via a waveguide in a silicon photonics substrate setting.

FIG. 1 is a schematic diagram of a photodiode being used conventionally in a silicon photonics circuit for detecting an optical signal delivered via a waveguide in a silicon photonics substrate setting. As shown, in a silicon photonics substrate 10, a portion of a silicon photonics integrated circuit includes an input port 100 for receiving an incoming optical signal. Optionally, the optical signal is delivered via a waveguide 101 formed in the silicon photonics substrate 10. In a conventional setting for detecting or monitoring the optical signal, a tap coupler 300 is coupled to the waveguide 101 to split a small portion (e.g., 5%) of the optical signal to a taping output port 103 while keeping major portion (95%) of the optical signal in the waveguide 102. The conventional setting for detecting or monitoring the optical signal further includes a silicon-photonics-based photodiode (PD) 400 coupled to the taping output port 103. Optionally, the PD 400 is configured to convert (absorb) light of the optical signal to a photocurrent 410 as the photodiode reversely biased. Measuring the photocurrent 410 leads to detection of the optical signal. Optionally, the photodiode PD 400 is formed in silicon photonics platform directly built in the silicon photonics substrate 10. Optionally, the photodiode PD 400 is a Ge-on-Si photodiode having a germanium absorption layer on top of a silicon device layer of a silicon-on-insulator (SOI) substrate. Optionally, the Ge-on-Si photodiode is configured to detect optical signal transmitted with high data rate. However, the photodiode 400 may have relatively high or increasing dark current on top of the photocurrent converted from the optical signal, introducing higher noise and lower signal-detection sensitivity under this conventional setting especially when the optical signal has a low optical power while the PD 400 works in a high-temperature (e.g., up to 95° C.) environment over its lifetime.

Figure 2:
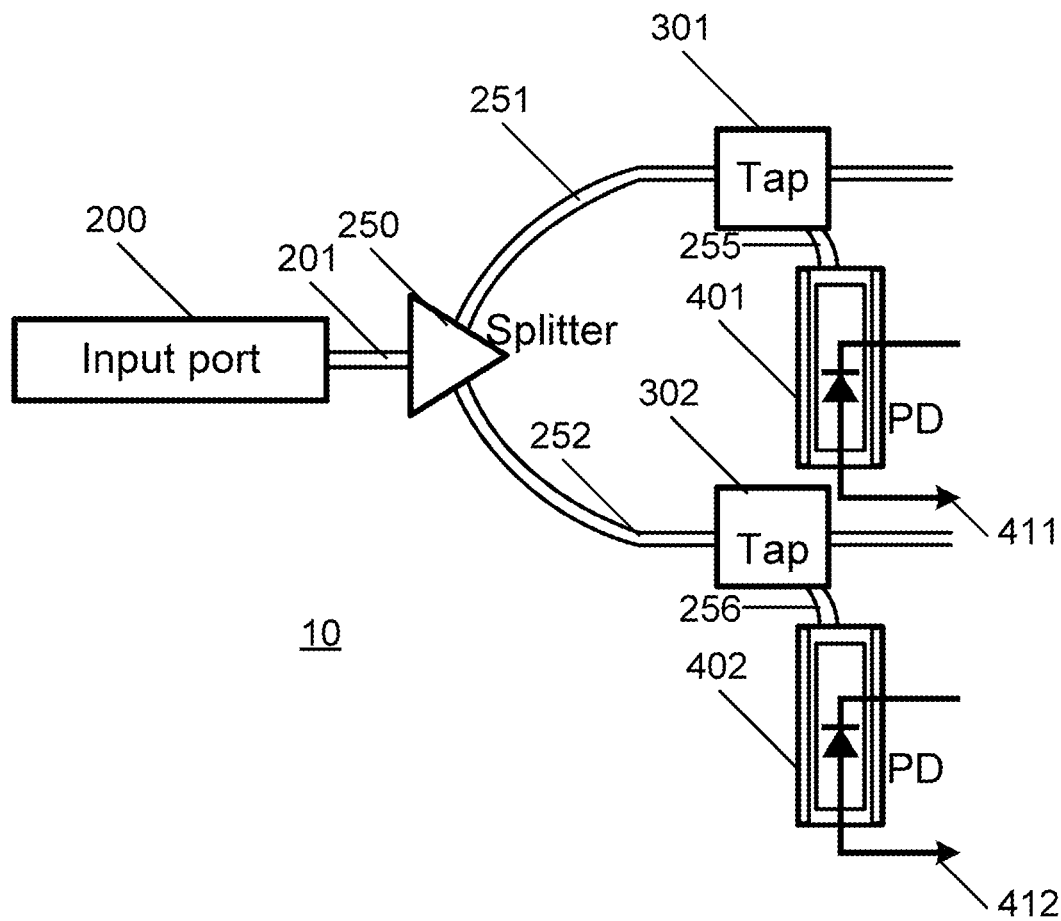
FIG. 2 is a simplified diagram of two photodiodes being used conventionally in a silicon photonics circuit for respectively detecting two split optical signals delivered via a waveguide in a silicon photonics substrate setting.

FIG. 2 is a simplified diagram of two photodiodes being used conventionally in a silicon photonics circuit for respectively detecting two split optical signals delivered via a waveguide in a silicon photonics substrate setting. As shown, a portion of silicon photonics integrated circuit receives an input optical signal coming from an input port 200 led into a waveguide 201 formed in a silicon photonics substrate 10. The silicon photonics integrated circuit includes a splitter 250 coupled to the waveguide 201 to split the input optical signal to two branches of waveguide 251 and 252. Optionally, the incoming optical signal is a polarization-sensitive signal including a mixture of Transverse electric (TE) mode and Transverse magnetic (TM) mode. Since the photodiode is generally adapted for detecting optical signal in TE mode. The partial signal in TM mode needs to be split from the input optical signal and be subjected to a polarization rotation operation to convert to a partial signal in TE mode. Referring to FIG. 2, the splitter 250 optionally is a polarization-rotation splitter which outputs TE mode partial signal to each split branch while one of the TE partial signal represents actual TM partial signal in original input optical signal.

In order to monitor the power level P of the input optical signal in the waveguide 201 that is, for the reason mentioned above, split to two partial signals respectively in two branches of waveguide, a first branch 251 and a second branch 252. An existing method is to couple one photodiode (PD) to a respective one of the two branches via one tap coupler. Referring to FIG. 2, a first PD 401 is coupled to a taping output port 255 of a first tap coupler 301 connected to the first branch 251 to tap 5% power of a first partial signal thereof and a second PD 402 is coupled to a taping output port 256 of a second tap coupler 302 connected to the second branch 252 to tap 5% power of a second partial signal thereof. The first PD 401 is configured to convert the first partial signal into a detectable photocurrent $I_{ph1}$ drawn from anode 411. By measuring the photocurrent $I_{ph1}$ at the anode 411 of the first PD 401 a power level P1 of the first partial signal is determined. The second PD 402 is configured to convert the second partial signal into another detectable photocurrent $I_{ph2}$ drawn from anode 412. By measuring the photocurrent $I_{ph2}$ at the anode 412 of the second PD 402 a power level P2 of the second partial signal is determined. In principle, the power of the input optical signal, P=P1+P2, can be detected or monitored.

However, the current drawn from the anode 411 or 412 also includes a dark current associated with the respective one PD 401 or 402. Optionally, the PD 401 or 402 is provided with Ge photodiode formed in SOI substrate. For a single Ge Photodiode on SOI substrate, its dark current $I_{dk}$ can increase as much as 8 times when temperature increases from room temperature to 95° C. with a bias voltage of −2V. Additionally, the dark current $I_{dk}$ can increase as much as 4 times at a bias voltage of −2V over its 8000 hours lifetime. The significant changes of the dark current of PD over temperature and over lifetime will impact the sensitivity of detecting low-power optical signal.

Figure 3:
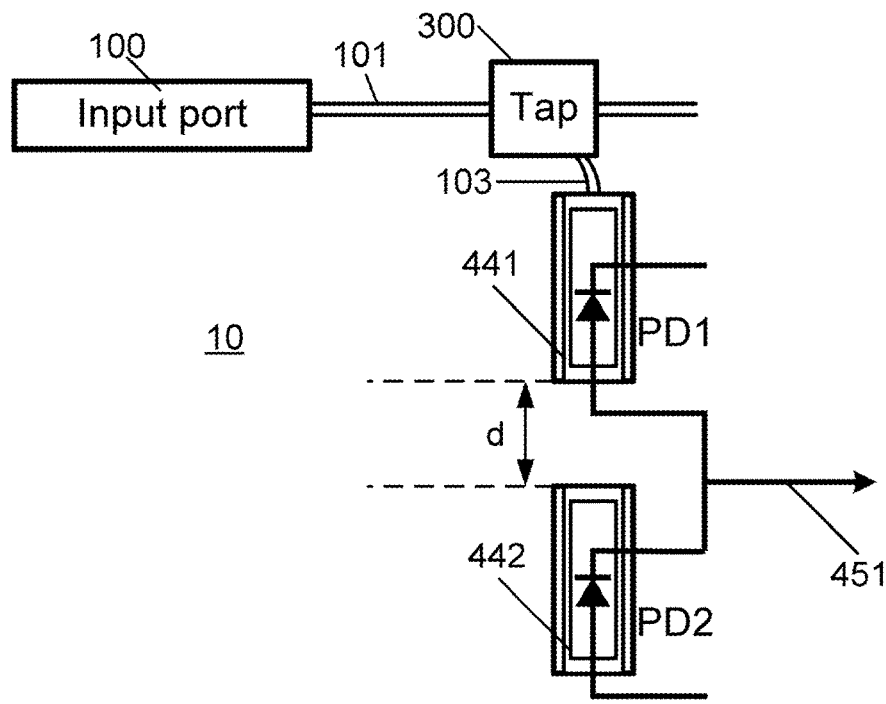
FIG. 3 is a schematic diagram of a close-neighbor photodiode pair in a silicon photonics circuit being configured to detect a low-power optical signal delivered via a waveguide in a silicon photonics substrate setting according to an embodiment of the present disclosure.

FIG. 3 is a schematic diagram of a close-neighbor photodiode pair in a silicon photonics circuit being configured to detect a low-power optical signal delivered via a waveguide in a silicon photonics substrate setting according to an embodiment of the present disclosure. This diagram is merely an example, which should not unduly limit the scope of the claims. One of ordinary skill in the art would recognize many variations, alternatives, and modifications. As shown in an embodiment, a pair of close-neighbor photodiodes, PD1 and PD2 formed under a same CMOS process on the silicon photonics substrate 10, is configured to be coupled in a similar silicon photonics circuit setup like FIG. 1 for detecting an input optical signal in low-power received from an input port 100. Optionally, the silicon photonics substrate 10 is provided as a silicon-on-insulator (SOI) substrate having a silicon device layer on a buried oxide (BOX) layer.

In the embodiment, the same CMOS process for forming the pair of PDs in close neighboring distance d in the silicon photonics substrate 10, if d is limited to about 500 nm or less, would lead to two PDs with nearly redundant physical properties. Among the pair of PDs, a first photodiode PD1 441 is a main PD that is optically coupled to a taping output port 103 of a tap coupler 300 in the waveguide 101 connected to the input port 100. A second photodiode PD2 442 is a dummy PD that is not optically coupled to the waveguide 101 but electrically coupled in series, cathode to anode, to the main PD 441 or PD1. Thus, the main PD 441 serves a light-absorption/conversion device but the dummy PD 442 does not. Under reversed bias condition and the serial connection between the main PD and the dummy PD, the current drawn from the anode port 451 of the main PD 441 will be $I=I_{ph}+I_{dk1}-I_{dk2}$, where $I_{ph}$ is the photocurrent induced by the light conversion in the main PD 441 and $I_{dk1}$ and $I_{dk2}$ are respective dark current in the main PD and dummy PD 442. The physical properties of the silicon-photonics-based PDs, e.g., Ge-on-Si photodiodes, are depended upon the pattern layout of the absorption layer (Ge) and dimensions of PIN junction structure at least partially in the silicon device layer of the SOI substrate. These physical properties, such as the dark current in the Ge absorption layer, can be made substantially the same during a same CMOS fabrication process since the pair of photodiodes is located in close proximity with a distance d. For example, the distance d can be as smaller than 500 nm. Therefore, $I_{dk1} \approx I_{dk2}$ and the current drawn from the anode port 451 of the main PD 441 will be nearly pure photocurrent $I=I_{ph}$ with the dark current of the main PD 441 almost being canceled by the dark current of the dummy PD 442. This substantially reduced noise in measurement of photocurrent $I_{ph}$ and enhances photo-detection sensitivity for the silicon-photonics-based photodiode to detect low-power or even extremely-low-power optical signal delivered in the silicon photonics integrated circuit. In fact, the photo-detection sensitivity of the pair of photodiodes in close-neighbor positions nearly is doubled compared to a single photodiode.

Figure 4:
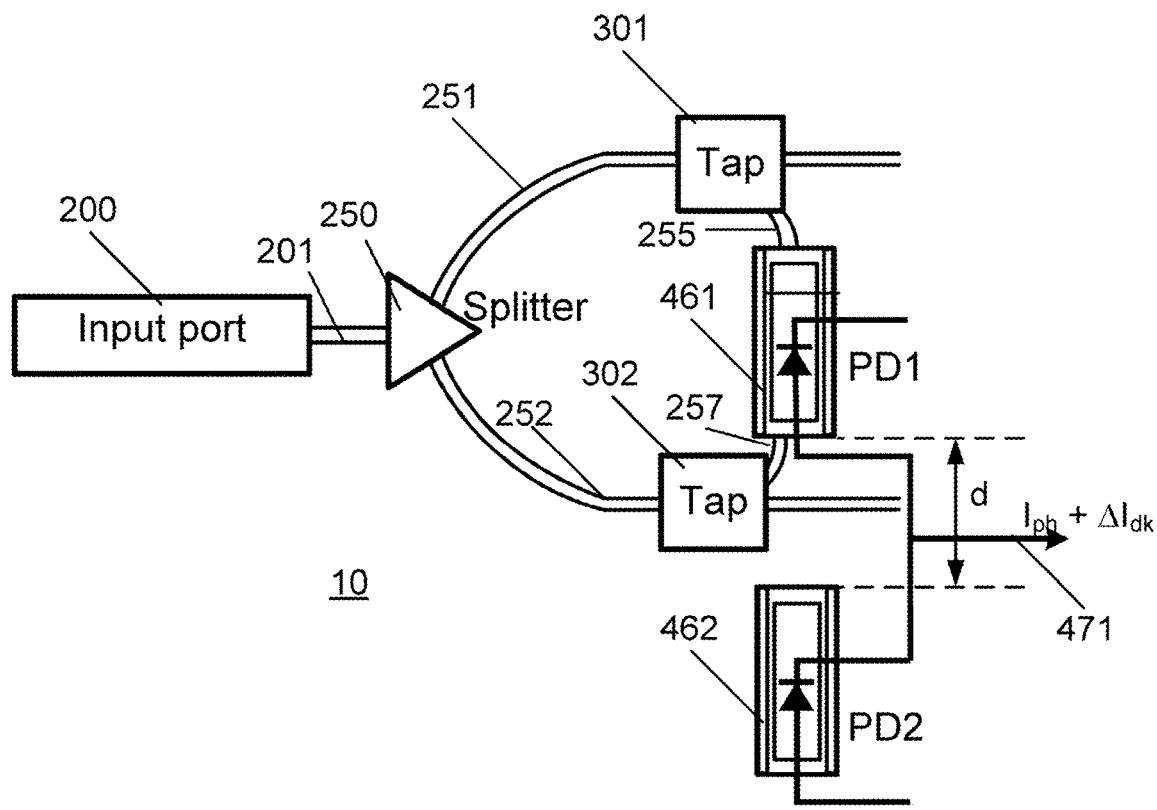
FIG. 4 is a schematic diagram of a close-neighbor photodiode pair in a silicon photonics circuit being configured to detect a low-power optical signal delivered via a waveguide with two or more split branches in a silicon photonics substrate setting according to an embodiment of the present disclosure.

FIG. 4 is a schematic diagram of a close-neighbor photodiode pair in a silicon photonics circuit being configured to detect a low-power optical signal delivered via a waveguide with two or more split branches in a silicon photonics substrate setting according to an embodiment of the present disclosure. This diagram is merely an example, which should not unduly limit the scope of the claims. One of ordinary skill in the art would recognize many variations, alternatives, and modifications. In another embodiment, as shown in FIG. 4, the optical signal into the waveguide 201 received from the input port 200 needs to be split to one or more branches for many reasons. At least for the case that the optical signal received from the input port 201 is a polarization sensitive signal which combines both a partial signal in TE mode and a partial signal in TM mode, a polarization splitter 250 is employed to split the partial signal in TE mode in one branch 251 and the partial signal in TM mode in another branch 252. Optionally, the splitter 250 is a polarization rotation splitter so that the partial signal in TM mode in branch 252 is also rotated to a partial signal in TE mode for facilitating power monitor of original TM mode component by a photodiode since the photodiode is generally adapted for detecting optical signal in TE mode.

In the embodiment of present invention, a pair of photodiodes with nearly redundant physical property is fabricated in the silicon photonics substrate 10 for detecting the optical signal received from the input port 200 especially for application where the optical power of the signal is low. As shown, two tap couplers 301 and 302 are respectively coupled with the two split branches, a first one 251 and a second one 252 to tap 5% power of respective partial signals in TE mode (note, the TM mode has been rotated to TE mode). The pair of photodiodes includes a main PD 461 or PD1 and a dummy PD 462 or PD2. Optionally, the pair of photodiodes PD1 and PD2 are formed in close proximity with a distance less than 500 nm via a same CMOS fabrication process in the silicon photonics substrate 10 so that PD1 and PD2 have nearly redundant physical properties such as dark current or resistance across the diode with similar values or similar variations upon a common cause like environment temperature, bias condition, and operation lifetime.

Unlike conventional approach, the invention provides a novel method for configuring the photodiodes for detecting optical signal in low power. In the embodiment as shown in FIG. 4, the main PD 461 or PD1 is configured to optically couple with a first taping output port 255 of a first tap coupler 301 in the first split branch 251 and at the same time couple with a second taping output port 257 of a second tap coupler 302 in the second split branch 252. While, the dummy PD 462 or PD2 is not optically coupled to any waveguide branches but is electrically coupled to the main PD 461 in series, anode to cathode, in an electrical sub-circuit for detecting the optical power received from the input port 200. An anode of the main PD 461 is connected to a cathode of the dummy PD 362. A current is drawn from the anode 471 of the main PD 461 with the pair of photodiodes in reversed bias condition. Based on the optical configuration of the embodiment shown in FIG. 4, one photodiode, the main PD 461 alone, is configured to absorb 5% light from both the first branch 251 and the second branch 252 to have nearly doubled value comparing to the case of FIG. 2 where light from only one branch is absorbed by just one photodiode. Additionally, based on the electrical configuration of the embodiment, the current I drawn from the anode 471 of the main PD 461 will be $I_{ph}+\Delta I_{dk}=I_{ph}+I_{dk1}-I_{dk2}$, where $I_{ph}$ is photocurrent converted from absorption of light tapped from both the first branch 251 and the second branch 252, $I_{dk1}$ is a dark current existed in the absorption layer of the main PD under a reversed bias, and $I_{dk2}$ is a dark current existed in the dummy PD under a similar reversed bias. As it is explained above, $I_{dk1}$ is substantially equal to $I_{dk2}$ as the pair of photodiodes is made to be nearly redundant in structure in a close neighbor distance of d via a same CMOS fabrication process on the silicon photonics substrate 10. Therefore, the effect of dark current variation, due to increasing environmental temperature over long-time operation of the silicon photonics integrated circuit with which the pair of photodiodes is associated, can be substantially minimized. In fact, the dark current variation $\Delta I_{dk}$ between two neighboring PDs is very small in an order of $10^{-2}$ to $10^{-3}$ μA at a reversed bias of −0.6V over 9000 hours. Thus, a major noise is substantially reduced in photocurrent measurement which is directly related to optical power of the optical signal received from the input port 200.

Figure 5:
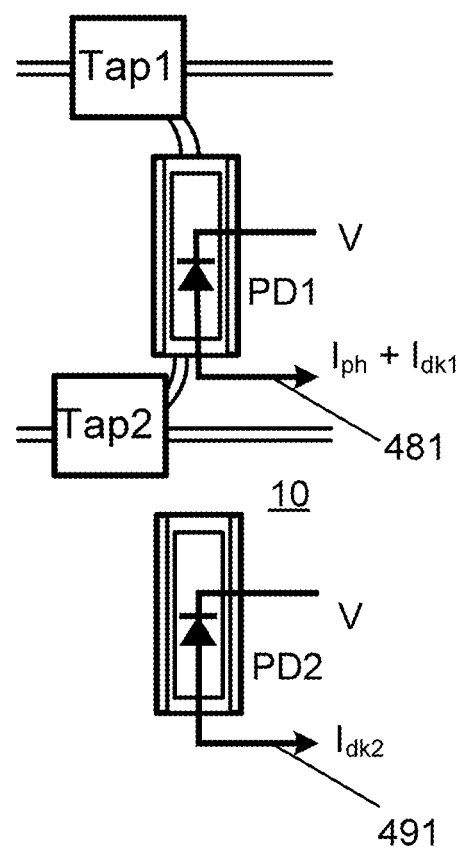
FIG. 5 is a schematic diagram of a close-neighbor photodiode pair in a silicon photonics circuit being configured to detect a low-power optical signal delivered from two or more split branches of waveguide according to another embodiment of the present disclosure.

In an alternative embodiment, the pair of nearly redundant photodiodes can be configured, as shown in FIG. 5, to optically couple the main PD (PD1) to one or more tap couplers (referred as Tap1, Tap2, . . . ) to receive light of the optical signals from one or more branches of an input waveguide and electrically independently laid in the electrical sub-circuit with the dummy PD (PD2) but under a same reversed bias condition for detecting the optical power. Thus, the PD1 is able to convert all light power of the optical signal being split into the one or more branches to a photocurrent $I_{ph}$. When the electrical sub-circuit is operated with both PD1 and PD2 under a same reversed bias voltage V, a first current $I_1=I_{ph}+I_{dk1}$ is drawn from anode 481 of PD1 and a second current $I_2=I_{dk2}$ is drawn from anode 491 of PD2, where Idk1 and Idk2 are respective dark currents associated with the PD1 and PD2 under the reversed bias voltage V. Both the first current I1 and the second current I2 can be collected and saved in memory and a firmware can be employed to deduce a differential value $I_1-I_2$, which is $I_{ph}+\Delta I_{dk}$. As the dark current variation $\Delta I_{dk}$ is substantially minimized by making the PD1 and the PD2 nearly redundant in physical properties, e.g., by fabricating the pair of PDs in close neighborhood on the silicon photonics substrate 10. Again, this method also achieves accurate detection of a low-power optical signal, especially the polarization-sensitive signal in coherent photonics system, with substantially enhanced sensitivity and reduced noise. This eliminates costly work on developing highly advanced individual photodiode with high sensitivity for detecting low-power optical signal. It only requires the pair of photodiodes to be formed in a close neighboring distance in a normal CMOS fabrication process.

Figure 6:
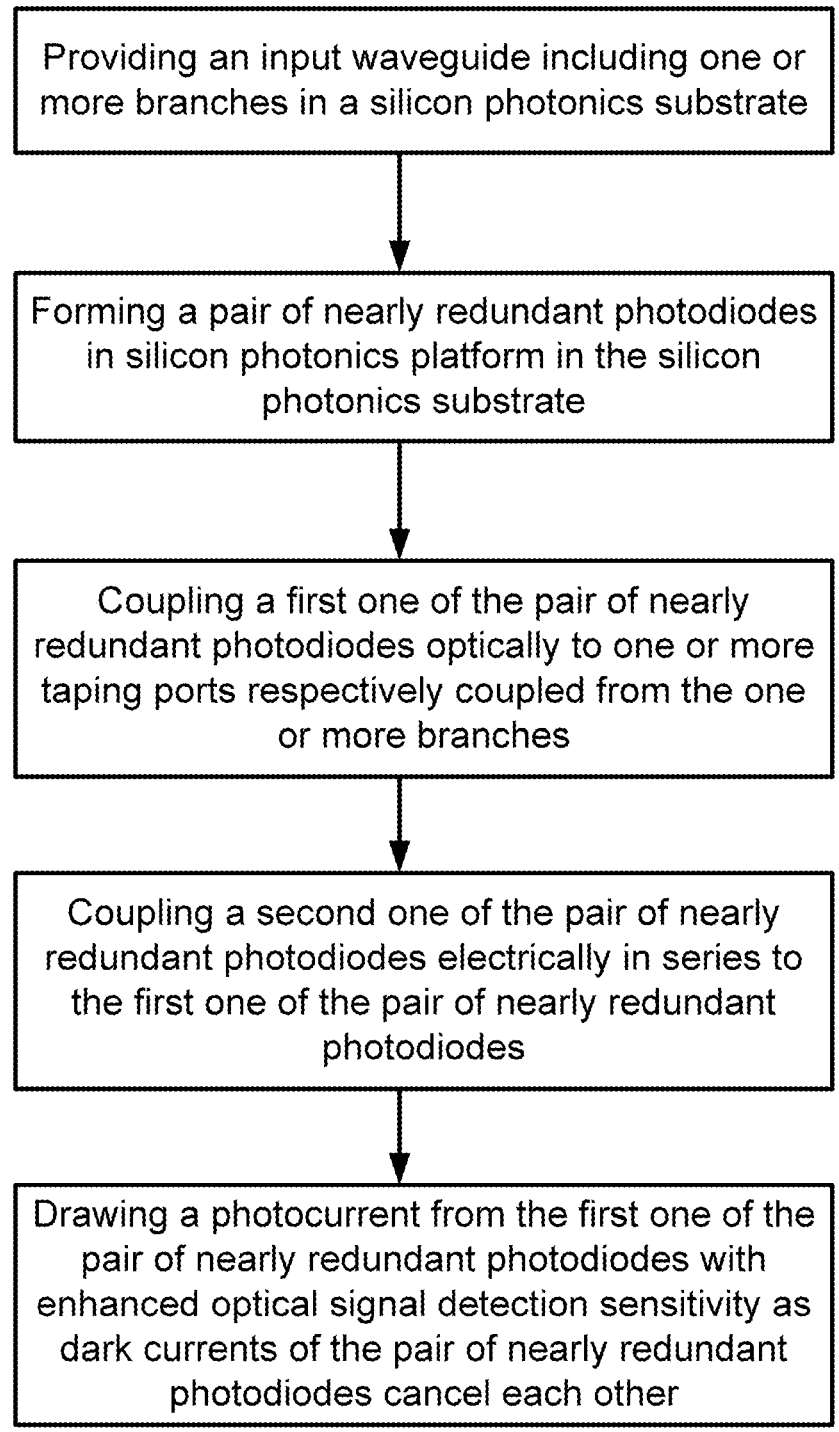
FIG. 6 is a flow chart showing a method of configuring a nearly redundant photodiode pair for detecting a low-power optical signal with high sensitivity according to an embodiment of the present disclosure.

FIG. 6 shows a flow chart to illustrate a method of forming a pair of nearly redundant photodiodes for detecting low-power optical signal according to an embodiment of the present disclosure. This diagram is merely an example, which should not unduly limit the scope of the claims. One of ordinary skill in the art would recognize many variations, alternatives, and modifications. As shown, the method includes a step of providing an optical input waveguide including one or more branches in a silicon photonics substrate. The input waveguide is configured to receive an input optical signal. Optionally, the input waveguide is a silicon-based waveguide. Optionally, the input optical signal is polarization sensitive signal including a mixture of a TE-mode component and a TM-mode component. An optical splitter is coupled to the input waveguide to split the input optical signal to respective one or more branches. Each branch is a silicon waveguide formed in the silicon photonics waveguide. Optionally, the optical splitter is a silicon-based waveguide-like splitter formed in the same substrate. Optionally, the one or more branches includes a first branch and a second branch. Optionally, the first branch receives a TE-mode optical signal with partial power of the input optical signal that is split by the optical splitter and the second branch receives a TM-mode optical signal with rest partial power of the input optical signal. Optionally, the optical splitter is provided as a polarization splitter rotator so that the TM-mode optical signal in the second branch has been converted to TE-mode optical signal for facilitating optical detection by photodiode in silicon photonics platform. Optionally, the input optical signal is transmitted with low-power in many high-speed data communication applications. Optionally, the input waveguide or at least each split branch of the input waveguide includes a tap coupler in silicon photonics platform formed in the same substrate to tap out a small percentage (~5%) of optical power into a taping output port for detecting the input optical signal (or the partial signal in each split branch).

Referring to FIG. 6, the method includes a step of forming a pair of nearly redundant photodiodes in silicon photonics platform in the silicon photonics substrate. Optionally, the silicon photonics substrate is a silicon-on-insulator (SOI) substrate having a silicon device layer on a buried oxide layer. Optionally, the photodiode in silicon photonics platform is a Ge-on-Si photodiode having a strained germanium layer serving an optical absorption layer over the silicon device layer of the silicon-on-insulator substrate wherein a PIN or PN junction can be formed at least partially in the silicon device layer to take the reversed bias for driving the photo-converted carrier charges to become a photocurrent to the anode of the photodiode. Optionally, the formation of the Ge-on-Si photodiode is realized via a CMOS fabrication process on the SOI substrate. Optionally, multiple Ge-on-Si photodiodes of a same design, geometry, doping characteristics can be formed in a same CMOS fabrication process. In other words, a pair of nearly redundant photodiodes can be formed in the CMOS fabrication process. At least, the pair of nearly redundant photodiodes can be a neighboring pair of photodiodes formed in the process such that the layer thickness, doping characteristics, and other mechanical or electrical properties are substantially the same between them, which leads to nearly the same physical properties like characteristic dark current under a same bias condition across the junction of the photodiode.

Referring again to FIG. 6, the method further includes a step of coupling a first one of the pair of nearly redundant photodiodes optically to one or more taping output ports respectively coupled from the one or more branches. Optionally, the pair of nearly redundant photodiodes is formed near the one or more taping output ports. Optionally, the one or more taping output ports includes a first taping output port of a first tap coupler coupled to the first split branch of waveguide which carries partial optical signal in TE-mode and a second taping output port of a second tap coupler coupled to the second split branch of waveguide which carries partial optical signal in TM-mode. Optionally, the splitter is also a polarization rotator which is able to convert the partial signal in TM-mode in the second split branch to a partial signal in TE-mode. The first one of the pair of nearly redundant photodiodes is chosen as a main PD to couple each of the first taping output port and the second taping output port to allow the germanium absorption layer to absorb light therefrom. This step naturally enlarges the power level of the absorbed light comparing to using a single PD to detect light branch one individual branch only. As the input optical signal may be transmitted in low-power for many applications, this step allows the main PD be used to detect optical signal at its maximum power level.

Referring to FIG. 6, the method additionally includes a step of coupling a second one of the pair of nearly redundant photodiodes electrically in series to the first one of the pair of nearly redundant photodiodes. The second one of the pair of nearly redundant photodiodes is chosen as a dummy PD. Although it is not coupled to any taping output port to absorb light from any branch of waveguide, the dummy PD is configured in an electrical detection sub-circuit associated with the pair of photodiodes by coupling its cathode to the anode of the main PD. Optionally, the dummy PD is formed in a close-proximity neighborhood of the main PD in the silicon photonics substrate so that an electrical conductive wiring between the dummy PD and the main PD can be laid convenient during the CMOS fabrication process for forming the electrical detection sub-circuit. Optionally, the dummy PD is a nearly redundant to the main PD in terms of physical properties so that when a reversed bias is applied to the pair of photodiodes each of the dummy PD and the main PD shares the bias voltage nearly equally, but only the main PD is used to absorb light signal.

Referring to FIG. 6 again, the method furthermore includes a step of drawing a photocurrent from the first one of the pair of nearly redundant photodiodes with enhanced optical signal detection sensitivity as dark currents of the pair of nearly redundant photodiodes cancel each other. The step includes applying a reversed bias voltage across the pair of photodiodes. Since the pair of photodiodes is electrical connected in series and has nearly redundant physical properties like the PN junction structural geometry dimension and electrical doping characteristics in respective layers of the PN junction, the first one (the main PD) and the second one (the dummy PD) of the pair of photodiodes are substantially equally share the bias voltage. For the main PD under the reversed bias condition is used to absorb light from the one or more branches of input waveguide, a current drawn from an anode of the main PD shall include a photocurrent converted from all the light absorbed by the germanium absorption layer of the main PD. At the same time, due to the electrical connection in series of the pair of photodiodes under the reversed bias condition, the current drawn from the anode of the main PD (which is also a cathode of the dummy PD) shall includes contribution of respective dark currents of the two PDs. In fact, one dark current from the main PD is a positive additive to the photocurrent while another dark current from the dummy PD is a negative additive to the photocurrent. As the physical properties of the pair of photodiodes are nearly the same and share substantially equally the reversed bias voltage, the dark current of the dummy PD nearly cancels the dark current of the main PD in the current drawn from the anode of the main PD. This substantially reduces noise in photocurrent measurement as the collected current from the anode by the electrical detection sub-circuit is substantially close to the true value of photocurrent converted from the light absorbed by the main PD.

In an alternative embodiment, the dummy PD is configured to receive a common reversed bias voltage but otherwise not connected to the main PD electrically. Therefore, the current $I_m$ drawn from the anode of the main PD shall include a photocurrent $I_{ph}$ converted from the light absorbed and a dark current $I_{dkm}$ under the reversed bias voltage. At the same time, another current $I_d$ is drawn from anode of the dummy PD under the same reversed bias voltage includes only a dark current $I_{dkd}$ thereof since no light is absorbed by the dummy PD. Both the current $I_m$ and the current $I_d$ can be collected into a memory device of a controller associated with the electrical detection sub-circuit. A firmware preloaded in the controller can conduct a calculation to subtract $I_d=I_{dkd}$ from $I_m=I_{ph}+I_{dkm}$. Under assumption of the dummy PD is made nearly redundant to the main PD, the dark current $I_{dkd}$ of the dummy PD will be substantially equal to the dark current $I_{dkm}$ of the main PD under a common reversed bias voltage, the subtraction of $I_m-I_d$ gives a true value of the photocurrent $I_{ph}$ as the dark current $I_{dkd}$ cancels the dark current $I_{dkm}$.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A circuit for detecting an optical signal transmitted via a first waveguide, the circuit comprising:
   a photonics substrate;
   a first photodiode formed in the photonics substrate and coupled to first and second branches of the first waveguide, the first photodiode configured to (i) receive respective portions of the optical signal transmitted via the first and second branches of the first waveguide and (ii) convert light power of the optical signal from both portions of the optical signal received via the first and second branches to generate a first current based on the optical signal; and
   a second photodiode formed in the photonics substrate without being coupled to the first or any other waveguide, the second photodiode being configured to output a second current without receiving a portion of the optical signal, the second current corresponding to a dark current induced in the second photodiode,
   the circuit being configured to subtract the second current from the first current to generate an output signal corresponding to a power of the optical signal without dark current induced in the first photodiode.

2. The circuit of claim 1, the first photodiode and the second photodiode forming a close-neighbor pair.

3. The circuit of claim 2, the second photodiode being located within 500 nanometers (nm) of the first photodiode in the photonics substrate.

4. The circuit of claim 3, the first photodiode and the second photodiode being formed in the photonics substrate under a same complementary metal-oxide semiconductor (CMOS) process.

5. The circuit of claim 4, the dark current induced in the second photodiode being the same as a dark current induced in the first photodiode.

6. The circuit of claim 1, the first photodiode being coupled to the first waveguide via a first tap coupler, a second tap coupler, and a splitter.

7. The circuit of claim 1, the second photodiode being coupled in series with the first photodiode.

8. The circuit of claim 7, the circuit generating the output signal at a node between the first photodiode and the second photodiode.

9. The circuit of claim 8, the output signal corresponding to a photocurrent induced in the first photodiode.

10. The circuit of claim 1, the second photodiode not being coupled to the first photodiode.

11. The circuit of claim 10, the second photodiode having a same reverse bias condition as the first photodiode.

12. The circuit of claim 11, the second photodiode being connected to a same reverse bias voltage as the first photodiode.

13. The circuit of claim 12, the output signal corresponding to a difference between an output current of the first photodiode and an output current of the second photodiode.

14. The circuit of claim 13, the output current of the first photodiode being a photocurrent induced in the first photodiode and a dark current induced in the first photodiode, and the output current of the second photodiode being the dark current induced in the second photodiode.

15. A method for detecting an optical signal transmitted via a waveguide, the method comprising:
  receiving, via first and second branches of a waveguide, respective portions of the optical signal at a first photodiode formed in a photonics substrate;
  using the first photodiode, converting light power of the optical signal from both portions of the optical signal received via the first and second branches to generate a first current based on the optical signal;
  using a second photodiode formed in the photonics substrate, without being coupled to any waveguide, the second photodiode outputting a second current without receiving a portion of the optical signal, the second current corresponding to a dark current induced in the second photodiode; and
  subtracting the second current from the first current to generate an output signal corresponding to a power of the optical signal without dark current induced in the first photodiode.

16. The method of claim 15, further comprising forming the second photodiode within 500 nanometers (nm) of the first photodiode under a same complementary metal-oxide semiconductor (CMOS) process such that the dark current induced in the second photodiode is substantially the same as a dark current induced in the first photodiode.

17. The method of claim 15, further comprising coupling the second photodiode in series with the first photodiode.

18. The method of claim 15, further comprising connecting the second photodiode to a same reverse bias voltage as the first photodiode.

19. The method of claim 18, further comprising generating the output signal based on a difference between an output current of the first photodiode and an output current of the second photodiode, the output current of the first photodiode being a photocurrent induced in the first photodiode and a dark current induced in the first photodiode, and the output current of the second photodiode being the dark current induced in the second photodiode.

\* \* \* \* \*